(12) United States Patent
Check et al.

(10) Patent No.: US 7,035,986 B2
(45) Date of Patent: Apr. 25, 2006

(54) SYSTEM AND METHOD FOR SIMULTANEOUS ACCESS OF THE SAME LINE IN CACHE STORAGE

(75) Inventors: Mark A. Check, Hopewell Junction, NY (US); Jennifer A. Navarro, Poughkeepsie, NY (US); Chung-Lung K. Shum, Wappingers Falls, NY (US); Timothy J. Slegel, Staatsburg, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 10/435,967

(22) Filed: May 12, 2003

(65) Prior Publication Data

US 2004/0230760 A1 Nov. 18, 2004

(51) Int. Cl.
*G06F 12/00* (2006.01)
(52) U.S. Cl. .................. 711/168; 711/118; 711/127; 711/157; 711/207
(58) Field of Classification Search ................ 711/168, 711/207, 127, 118, 157
See application file for complete search history.

(56) References Cited

U.S. PATENT DOCUMENTS

| | | | | |
|---|---|---|---|---|
| 5,640,534 A | 6/1997 | Liu et al. | ..................... | 711/146 |
| 5,805,855 A | 9/1998 | Liu | ............................. | 711/108 |
| 5,890,217 A * | 3/1999 | Kabemoto et al. | .......... | 711/141 |
| 6,202,128 B1 | 3/2001 | Chan et al. | .................. | 711/131 |
| 6,493,800 B1 * | 12/2002 | Blumrich | ..................... | 711/129 |

* cited by examiner

*Primary Examiner*—Mano Padmanabhan
*Assistant Examiner*—Mehdi Namazi
(74) *Attorney, Agent, or Firm*—Lynn L. Augspurger; Cantor Colburn LLP

(57) ABSTRACT

An embodiment of the invention is a processor for providing simultaneous access to the same data for a plurality of requests. The processor includes cache storage having an address sliced directory lookup structure. A same line detection unit receives a plurality of first instruction fields and a plurality of second instruction fields. The same line detection unit generates a same line signal in response to the first instruction fields and the second instruction fields. The cache storage simultaneously reads data from a single line in the cache storage in response to the same line signal.

18 Claims, 4 Drawing Sheets

| #100 | #101 | #102 | #103 | #104 | #105 |
|------|------|------|------|------|------|
| DECODE | ADDRESS | CACHE | CACHE HIT & | EXECUTION | PUT-AWAY |
| | GENERAT-ION | READ | DATE RETURN | | |

FIG. 1

SYSTEM AND METHOD FOR SIMULTANEOUS ACCESS OF THE SAME LINE IN CACHE STORAGE

RELATED APPLICATIONS

This application is related to United States Patent Application entitled "System and Method for Simultaneous Access of the Same Doubleword in Cache Storage", U.S. patent application Ser. No. 10/436,221, filed contemporaneously with this application.

This application is related to United States Patent Application entitled "Parallel Cache Interleave Accesses with Address-Sliced Directories", U.S. patent application Ser. No. 10/436,217, filed contemporaneously with this application.

This application is related to United States Patent Application entitled "Long Displacement Instruction Formats", U.S. patent application Ser. No. 10/403,417, filed contemporaneously with this application.

FIELD OF THE INVENTION

This invention relates to cache storage access in a microprocessor with multiple simultaneous requests. The invention is particularly directed to a method and system of accessing the same cache line for multiple simultaneous requests where the cache has a plurality of cache interleaves with an address sliced directory.

The descriptions set forth in these co-pending applications are hereby incorporated into the present application by this reference. These co-pending applications and the present application are owned by one and the same assignee, International Business Machines Corporation of Armonk, N.Y.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

BACKGROUND

It is common in computer processor design to incorporate cache storage to provide memory access in less cycles than accessing main memory storage. U.S. Pat. Nos. 5,640,534, 5,805,855, and 6,202,128 reference designs in which a plurality of cache lines can be accessed by means of an effective address and a real address with a priority scheme to determine which request is made when conflicts occur to read the same line. From evaluation of performance and program instruction execution traces it has been found that there are many cases where both simultaneous requests are made to the same line in the cache. To enable maximum execution rates requires the simultaneous cache access to the same line. Thus, techniques are needed to efficiently handle simultaneous requests made to the same line in the cache.

SUMMARY OF THE INVENTION

An embodiment of the invention is a processor for providing simultaneous access to data for a plurality of requests. The processor includes cache storage having an address sliced directory lookup structure. A same line detection unit receives a first instruction including a plurality of first instruction fields and a second instruction including a plurality of second instruction fields. The same line detection unit generates a same line signal in response to the first instruction fields and the second instruction fields. The cache storage simultaneously reads data from a single line in the cache storage in response to the same line signal.

These and other improvements are set forth in the following detailed description. For a better understanding of the invention with advantages and features, refer to the description and to the drawings.

BRIEF DESCRIPTION OF THE DRAWINGS

FIG. 1 illustrates exemplary stages of a processor pipeline.

Figure 2:
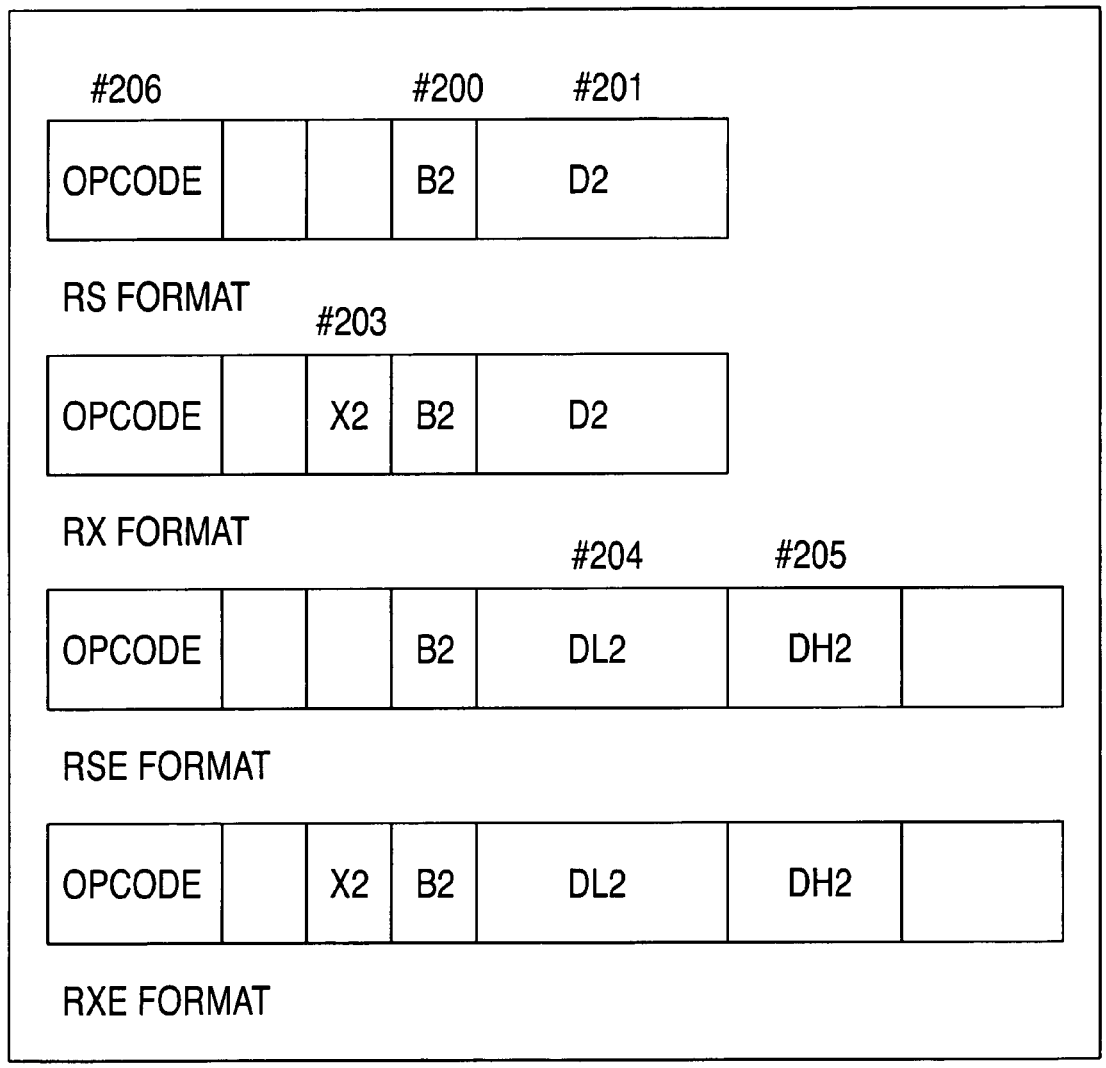
FIG. 2 illustrates exemplary instruction formats.

The detailed description explains the preferred embodiments of the invention, together with advantages and features, by way of example with reference to the drawings.

DETAILED DESCRIPTION OF EXEMPLARY EMBODIMENTS

Embodiments of the invention provide a method and system to detect when multiple requests are possibly to the same cache line without comparing the final results of the generated address when there is an address sliced directory conflict. The detection is based on fields in the instruction text of the two instructions. The instruction formats are described in the IBM Z/Architecture Principles of Operation, Publication SA22-7832-00, pages 5-2 to 5-7. Additional formats are described in U.S. patent application entitled "Long Displacement Instruction Formats", Ser. No. 10/403,417. Once detected this information is signaled to the cache to allow the cache to use information from the single directory lookup to be used to read two different interleaves for the same line simultaneously.

An exemplary processor for implementing embodiments of the invention has a six stage pipeline that is capable of decoding and executing multiple instructions in a single cycle. As shown in FIG. 1, the processor has a six stage pipeline including an instruction decode 100, address generation 101, cache directory and interleave read 102, data validation and return 103, execution 104, and put away 105. The processor can simultaneously decode two instructions during the first cycle of the pipeline. The processor can simultaneously generate two addresses during the second cycle of the pipeline. The methods and systems disclosed herein also permit simultaneous same line access even when there is address sliced directory conflict.

Embodiments of the invention allow for multiple (e.g., two) instructions to execute together during the execution cycle 104 which return data together during the cache return cycle 103 for which the data for both instructions are in different interleaves of the cache for the same cache line. To support this operation, both interleaves for the same line are read during the cache read cycle 102. The addresses for the two requests are generated during the address generation cycle 101. The time required to generate this address does not permit the ability to compare the two addresses to see if they are for the same cache line. To determine if both cache addresses are for the same cache line, the processor implements a detection method during the decode cycle 100 by examining parts of the instruction text of the two instructions. If both instructions need to address the same cache line, the processor access will read two interleaves for the same line based only on the information from the single directory lookup.

FIG. 2 illustrates exemplary instruction formats and associated fields. Each instruction includes an opcode field 206 identifying the instruction and a base register field 200. RX format and RXE format instructions include an index field 203. A displacement field may be a one-part 201 as shown in the RS and RX format. The RSE and RXE format instructions have a two-part displacement field divided into a low order part 204 and a high order part 205. As described in further detail herein, the processor examines fields of the instructions to determine if both instructions need to address the same cache line.

Figure 3:
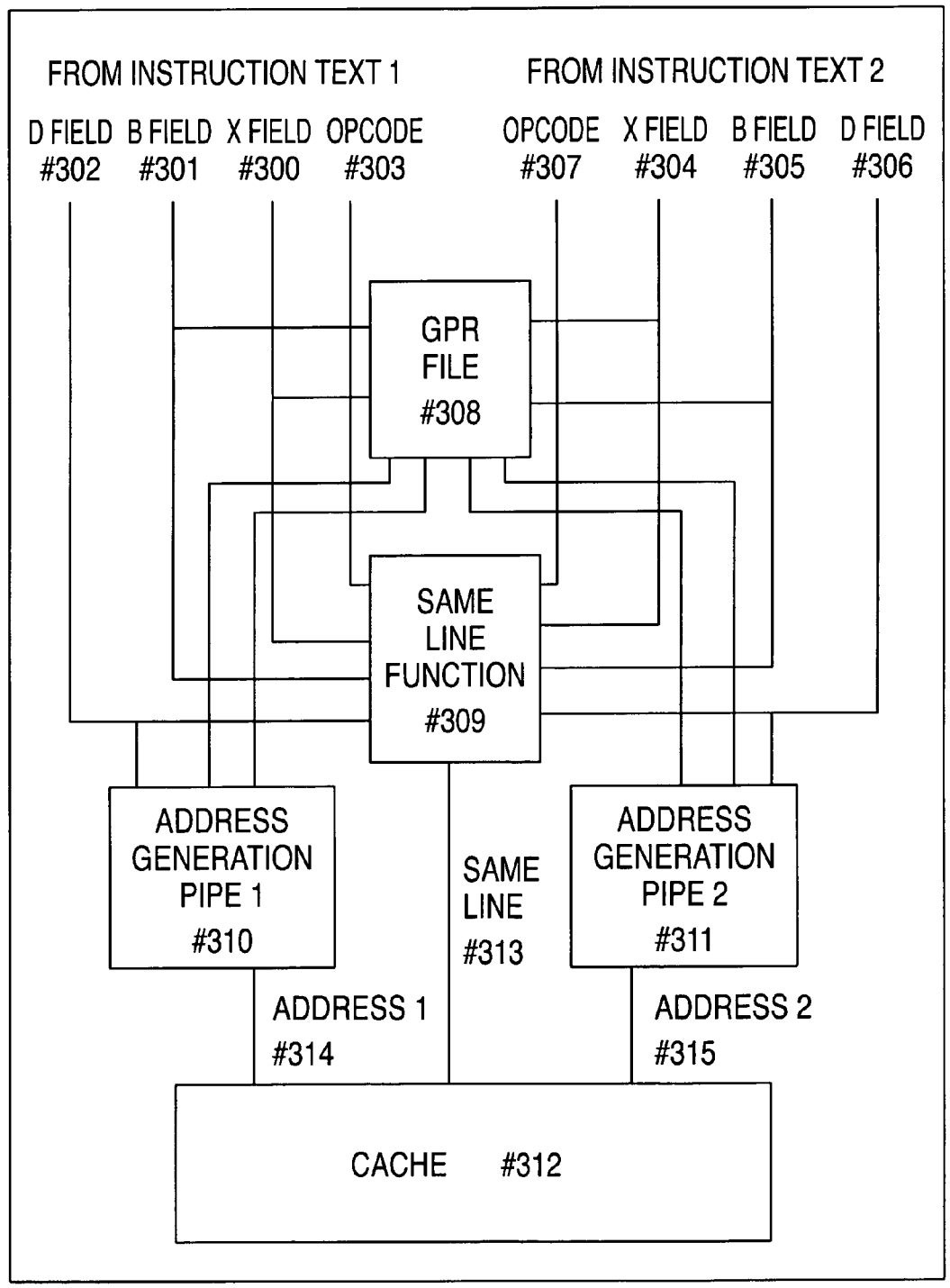
FIG. 3 illustrates components of an exemplary processor.

FIG. 3 illustrates components of an exemplary processor for determining when two instructions address the same cache line. In an embodiment of the invention, parallel processing pipelines are provided for accessing the cache without incurring significant area increase by not requiring multi-ported arrays. Significant area increase is avoided by splitting the cache directories (one for each processing pipeline) wherein the directories are split between the even and odd address of the cache and data fetches (odd or even) are processed by the corresponding pipeline (odd or even). Each processing pipeline has access to the entire cache to allow for mismatching data fetches (odd fetch on an even pipeline or vice versa) thus two fetches to the same line can be processed at the same time.

Disclosed herein is a microprocessor with an instruction unit (I-unit), an execution unit (E-unit), and a split L1 instruction and data cache. The instruction unit may issue up to 2 operand requests to the data cache. The data cache can process up to 2 operand requests and send up to 2 operand data to the execution unit. Within the data cache, 2 processing pipelines are interleaved by line address. Each pipeline has a directory that contains half of the data cache lines. The data cache array itself is structured as a 4-way interleave based upon the double word (a 64 bit operand) address. In addition, the data cache array can be accessed from either pipeline.

FIG. 3 depicts instruction text 1 and instruction text 2 from instructions received on two pipes. A first instruction has a displacement field 302, a base register field 301, an index field 300 and an opcode field 303. A second instruction has a displacement field 306, a base register field 305, an index field 304 and an opcode field 307.

During the decode cycle 100 the base register fields 301 and 305 and index fields 300 and 304 are used to read from the general purpose register (GPR) file 308 the base and index register contents. During the address generation cycle 101 these register contents with the displacement fields 302 and 306 are used in address generation units 310 and 311 to form addresses 314 and 315 for each operand. These are sent to the cache 312 during the address generation cycle 101. During that same address generation cycle the information from the same line detection unit 309 indicates to cache 312 that these are for the same line as shown by same line signal 313. The same line signal 313 either enables or disables the simultaneous access to different interleaves of the same cache line. The same line detection unit 309 is described in further detail with reference to FIG. 4.

The cache 312 during the cache read cycle 102 will read two interleaves for the same line based only on the information from the single directory lookup that did not have a cache directory address conflict. This allows the cache to return data for both requests during the return cycle 103, execution of both instructions during the execution cycle 104 and result put-away for both instructions during the put-away cycle 105.

Figure 4:
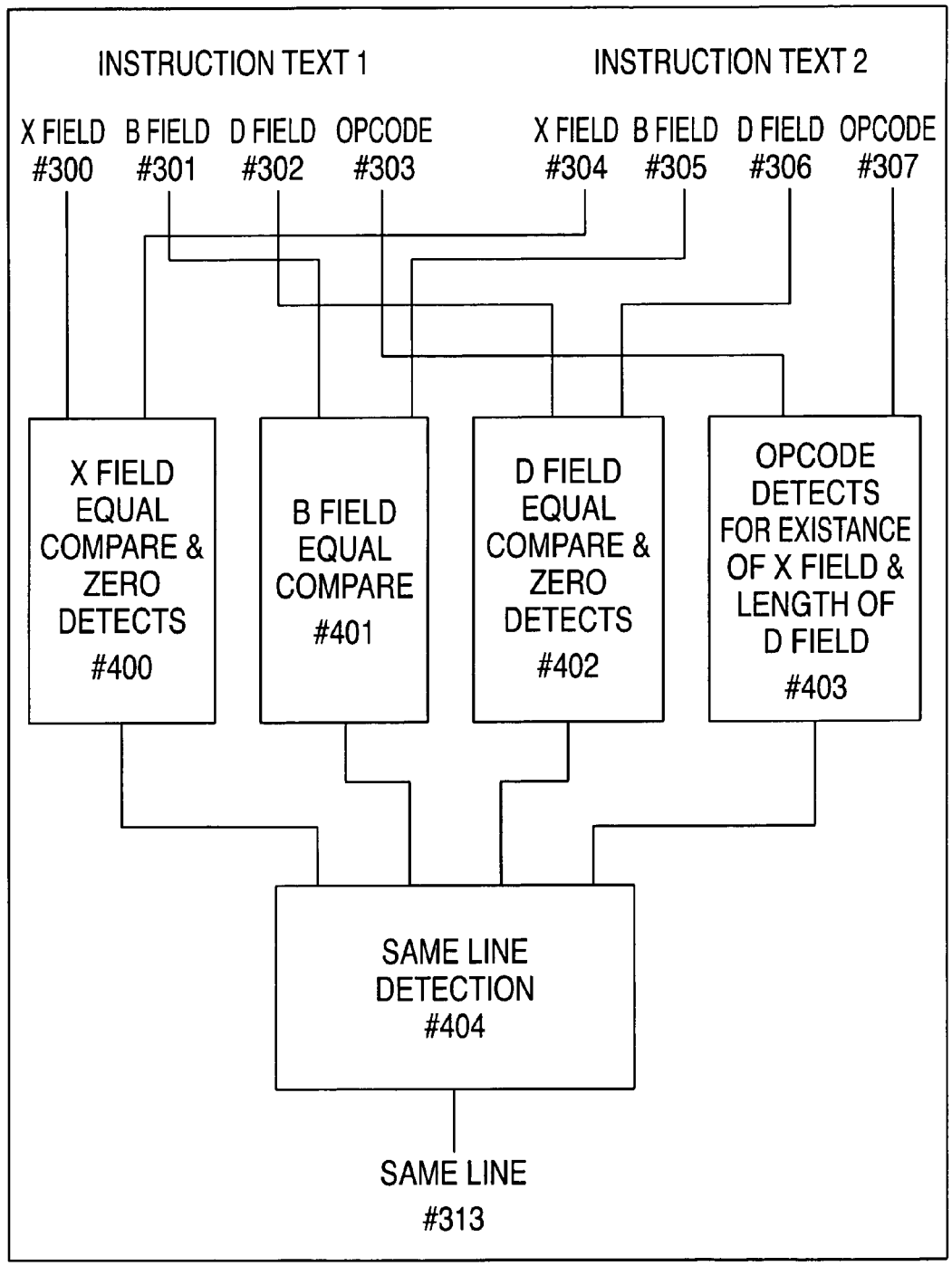
FIG. 4 illustrates exemplary same line detection logic.

FIG. 4 is a block diagram of an exemplary same line detection unit 309. Same line detection unit 309 includes index field logic 400, base register field logic 401, displacement field logic 402 and opcode field logic 403. A same line detector 404 receives an output from logic devices 400–403 to detect whether the same line of cache is addressed by both instructions.

The opcode fields 303 and 307 are examined by opcode field logic 403 to determine if the instruction has an index register field 203 and the length of the displacement field which may be a one-part field 201 or a two-part field 204 and 205. The presence or absence of an index register field and the length of the displacement field is provided to the same line detector 404.

The base register fields 301 and 305 are checked for equality at base register field logic 401. The result of the comparison is provided to the same line detector 404. If the base register fields 301 and 305 are not equal, then the two instructions are not requesting the same line of cache. Thus, the same line signal 313 will not enable a simultaneous same line access.

Portions of the displacement fields 302 and 306 used to generate the cache line address are checked for equality at displacement field logic 402. The one part displacement field 201 and the lower part 204 of the two-part displacement field are checked for equality at displacement field logic 402. The high order part 205 of the displacement fields 302 and 306, when it exists, is checked to see if it is zero in each instruction or equal between the two instructions at displacement field logic 402.

If both displacement fields have the same format (i.e., both one-part or both two-part), these portions are compared for equality and if not equal, the then the two instructions are not requesting the same line of cache. Thus, the same line signal 313 will not enable a simultaneous same line access. If the displacement fields have different formats (i.e., one is one-part and the other is two-part), the lower part must equal the one-part displacement field and the upper part must be zero for an equality to be detected. Otherwise, the two instructions are not requesting the same line of cache and the same line signal 313 will not enable a simultaneous same line access.

The index fields 300 and 304, if present, from each instruction are checked to see if they are the same at index field logic 400. If both instructions have an index field, these fields are compared. If not equal, then the two instructions are not requesting the same line of cache and the same line signal 313 will not enable a simultaneous same line access.

If one instruction includes an index field and the other instruction does not, then the present index field is checked to determine is it is zero. If not zero, the two instructions are not requesting the same line of cache and the same line signal 313 will not enable a simultaneous same line access. If the sole index field has a value of zero, then the index field logic 400 does not prevent same line access. If neither instruction includes an index field (e.g., instruction formats RS and RSE in FIG. 2), then the index field logic 400 does not prevent simultaneous same line access.

The results of the index field logic 400, base register field logic 401 and displacement field logic 402, along with the information on what fields exist from opcode field logic 403 are used by same line detector 404 to determine if the addresses for the two instructions that were decoded in the decode cycle 100 are likely from the same cache line. If so, the same line detection unit 309 enables same line access to the cache through same line signal 313. The processor access will read two interleaves for the same line based only on the information from the single directory lookup.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A processor for providing simultaneous access to data for a plurality of requests, the processor comprising:
   cache storage having an address sliced directory lookup structure;
   a same line detection unit receiving a plurality of first instruction fields and a plurality of second instruction fields, said same line detection unit generating a same line signal in response to said first instruction fields and said second instruction fields;
   said cache storage simultaneously reading data from a single line in said cache storage in response to said same line signal;
   wherein the same line detection unit includes at least one of index field logic, base register field logic and displacement field logic, the at least one index field logic, base register field logic and displacement field logic preventing said cache storage simultaneously reading data from said single line in response to at least one of a index field, base register field and displacement field associated with the first instruction and the second instruction.

2. The processor of claim 1 wherein:
   said same line signal is generated during an instruction decode cycle and provided to said cache storage during an address generation cycle.

3. The processor of claim 1 wherein:
   said cache storage reads two different interleaves for the same line simultaneously.

4. The processor of claim 1 wherein:
   said same line detection unit includes index field logic;
   if both said first instruction fields and said second instruction fields include an index field, said index field logic comparing said first instruction index field to said second instruction index field and preventing said cache storage simultaneously reading data from said single line if said first instruction index field is not equal to said second instruction index field.

5. The processor of claim 1 wherein:
   said same line detection unit includes index field logic;
   if only one of said first instruction fields and said second instruction fields includes an index field, said index field logic determines if said index field is zero, said index field logic preventing said cache storage simultaneously reading data from said single line if said index field is not zero.

6. The processor of claim 1 wherein:
   said same line detection unit includes base register field logic;
   said base register field logic comparing a first instruction base register field to a second instruction base register field and preventing said cache storage simultaneously reading data from said single line if said first instruction base register field is not equal to said second instruction base register field.

7. The processor of claim 1 wherein:
   said same line detection unit includes displacement field logic;
   if said first instruction fields and said second instruction fields include displacement fields having a same format, said displacement field logic comparing a first instruction displacement field portion to a second instruction displacement field portion and preventing said cache storage simultaneously reading data from said single line if said first instruction displacement field portion is not equal to said second instruction displacement field portion.

8. The processor of claim 1 wherein:
   said same line detection unit includes displacement field logic;
   if said first instruction and said second instruction include displacement fields having different formats, said displacement field logic comparing a first instruction displacement field portion to a lower portion of said second instruction displacement field and preventing said cache storage simultaneously reading data from said single line if said first instruction displacement field portion is not equal to said lower portion of second instruction displacement field.

9. The processor of claim 8 wherein:
   if said instruction fields and said second instruction fields include displacement fields having different formats, said displacement field logic preventing said cache storage simultaneously reading data from said single line if an upper portion of second instruction displacement field is not zero.

10. A method for providing simultaneous access to a data cache storage having an address sliced directory lookup structure, the method comprising:
    receiving a plurality of first instruction fields and a plurality of second instruction fields; generating a same line signal in response to said first instruction fields and said second instruction fields; simultaneously reading data from a single line in said cache storage in response to said same line signal;
    preventing said cache storage simultaneously reading data from said single line in response to at least one of a index field, base register field, and displacement field associated with the first instruction and the second instruction.

11. The method of claim 10 wherein:
    said same line signal is generated during an instruction decode cycle and provided to said cache storage during an address generation cycle.

12. The method of claim 10 wherein:
    said cache storage reads two different interleaves for the same line simultaneously.

13. The method of claim 10 wherein:
    if both said first instruction fields and said second instruction fields include an index field, comparing said first instruction index field to said second instruction index field and preventing said cache storage simultaneously reading data from said single line if said first instruction index field is not equal to said second instruction index field.

14. The method of claim 10 wherein:
    if only one of said first instruction fields and said second instruction fields includes an index field, determining if said index field is zero and preventing said cache storage simultaneously reading data from said single line if said index field is not zero.

15. The method of claim 10 further comprising:
    comparing a first instruction base register field to a second instruction base register field and preventing said cache storage simultaneously reading data from said single line if said first instruction base register field is not equal to said second instruction base register field.

16. The method of claim 10 wherein:

if said first instruction fields and said second instruction fields include displacement fields having a same format, comparing a first instruction displacement field portion to a second instruction displacement field portion and preventing said cache storage simultaneously reading data from said single line if said first instruction displacement field portion is not equal to said second instruction displacement field portion.

17. The method of claim 10 wherein:

if said first instruction and said second instruction include displacement fields having different formats, comparing a first instruction displacement field portion to a lower portion of said second instruction displacement field and preventing said cache storage simultaneously reading data from said single line if said first instruction displacement field portion is not equal to said lower portion of second instruction displacement field.

18. The method of claim 17 wherein:

if said first instruction fields and said second instruction fields include displacement fields having different formats, preventing said cache storage simultaneously reading data from said single line if an upper portion of second instruction displacement field is not zero.

* * * * *